(12) United States Patent
Dutta et al.

(10) Patent No.: US 10,778,552 B2
(45) Date of Patent: Sep. 15, 2020

(54) STORAGE SYSTEM LATENCY EVALUATION BASED ON I/O PATTERNS

(71) Applicant: HEWLETT PACKARD ENTERPRISE DEVELOPMENT LP, Houston, TX (US)

(72) Inventors: Mayukh Dutta, Bangalore (IN); Manoj Srivatsav, Bangalore (IN); John J. Sengenberger, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/034,531

(22) Filed: Jul. 13, 2018

(65) Prior Publication Data

US 2019/0334801 A1    Oct. 31, 2019

(30) Foreign Application Priority Data

Apr. 30, 2018   (IN) .............. 201841016313

(51) Int. Cl.
| | | |
|---|---|---|
| G06F 15/16 | (2006.01) | |
| H04L 12/26 | (2006.01) | |
| G06F 11/34 | (2006.01) | |
| G06K 9/62 | (2006.01) | |
| H04L 29/08 | (2006.01) | |
| G06F 11/30 | (2006.01) | |

(52) U.S. Cl.
CPC ...... *H04L 43/0852* (2013.01); *G06F 11/3034* (2013.01); *G06F 11/3419* (2013.01); *G06K 9/6223* (2013.01); *H04L 67/1097* (2013.01)

(58) Field of Classification Search
CPC ............. H04L 43/0852; H04L 67/1097; G06F 11/3419; G06F 11/3034; G06K 9/6223
See application file for complete search history.

(56) References Cited

U.S. PATENT DOCUMENTS

| | | |
|---|---|---|
| 8,190,939 B2 | 5/2012 | Fields et al. |
| 8,832,330 B1 | 9/2014 | Lancaster |
| 8,935,500 B1 | 1/2015 | Gulati et al. |
| 9,104,572 B1 | 8/2015 | Thompson et al. |
| 9,135,191 B1 | 9/2015 | Dighe et al. |

(Continued)

OTHER PUBLICATIONS

Ben Woo, "The Pure Storage Vision: Orange Is Still the New Black," Jul. 10, 2017, <http://www.neuralytix.com/doc/10414>.

(Continued)

*Primary Examiner* — Richard G Keehn
(74) *Attorney, Agent, or Firm* — Hewlett Packard Enterprise Patent Department

(57) ABSTRACT

A system or method for identifying latency contributors in a data storage network, that may include creating a historical workload fingerprint model for a data storage network from training data, along with monitoring and classifying a current sample data from the data storage network into a cluster, current workload fingerprint, and current workload type. The method may further include assigning a score to the current sample data based on the historical workload fingerprint model and correlating measured latency values from the current sample data to historically measured latency related factors to create a latency score chart that identifies factors causing latency in the data storage network for the current sample data.

20 Claims, 14 Drawing Sheets

(56) References Cited

U.S. PATENT DOCUMENTS

| | | | |
|---|---|---|---|
| 9,489,138 | B1 | 11/2016 | Kumar et al. |
| 9,575,828 | B2 | 2/2017 | Agarwal et al. |
| 9,594,515 | B2 | 3/2017 | Hrischuk et al. |
| 9,772,794 | B2 | 9/2017 | Li et al. |
| 2008/0034148 | A1* | 2/2008 | Gower ................ G06F 11/3419 711/5 |
| 2009/0106602 | A1* | 4/2009 | Piszczek ................ G06F 11/008 714/42 |
| 2011/0072208 | A1 | 3/2011 | Gulati et al. |
| 2014/0208156 | A1* | 7/2014 | Muralimanohar ....... G11C 8/12 714/6.24 |
| 2014/0244643 | A1 | 8/2014 | Basak et al. |
| 2016/0165462 | A1 | 6/2016 | Tan et al. |
| 2016/0357443 | A1* | 12/2016 | Li ............................. G06F 3/065 |
| 2016/0359592 | A1 | 12/2016 | Kulshreshtha et al. |
| 2016/0359872 | A1 | 12/2016 | Yadav et al. |
| 2017/0017537 | A1 | 1/2017 | Razin et al. |
| 2017/0060769 | A1 | 3/2017 | Wires et al. |
| 2017/0093667 | A1 | 3/2017 | Thirumoorthy et al. |
| 2017/0206107 | A1 | 7/2017 | Guha |
| 2017/0329660 | A1 | 11/2017 | Salunke et al. |
| 2017/0371558 | A1* | 12/2017 | George ................ G06F 3/0611 |
| 2018/0027060 | A1 | 1/2018 | Metsch et al. |
| 2018/0123931 | A1 | 5/2018 | Sun et al. |
| 2019/0163553 | A1 | 5/2019 | Ramegowda et al. |
| 2019/0236149 | A1 | 8/2019 | Kuruvada et al. |
| 2019/0294476 | A1* | 9/2019 | Yadhav ................ G06F 9/5061 |

OTHER PUBLICATIONS

Gregg, B. D., "Latency Heat Maps," (Web Page), Dec. 18, 2017, 5 pages, http://www.brendangregg.com/HeatMaps/latency.html.

Gulati, A. et al., "PARDA: Proportional Allocation of Resources for Distributed Storage Access," (Research Paper), FAST, vol. 9, Jun. 1, 2009, pp. 85-98.

Juan Novella, "Introducing Pure1 META: Pure's AI Platform to Enable Self-Driving Storage," Jun. 13, 2017, <https://blog.purestorage.com/introducing-pure1-meta-pures-ai-platform-enable-self-driving-storage/>.

Mark Cox, "Pure Storage leverages Internet of Things with new Pure1 META AI platform," Jun. 14, 2017, <http://www.channelbuzz.ca/2017/06/pure-storage-leverages-internet-things-new-pure1-meta-ai-platform-21774/>.

Pure Storage, "Machine Learning with Pure1 Meta," Nov. 16, 2017, transcript of video content, accessed and Ttranscribed Apr. 19, 2018, <https://www.youtube.com/watch?v=n7R4I4O0dLE>.

Pure Storage, "Pure1: Cloud-Based Management, Analytics, and Support," 2016, <https://www.purestorage.com/content/dam/purestorage/pdf/datasheets/ps_ds5p_pure1_04.pdf>.

Gregg, B., "Detecting Outliers," (Research Paper), Jul. 1, 2013, 10 pages.

NetApp, Inc., "Workflow Guide for Managing Cluster Performance," (Research Paper), Jun. 2017, 138 pages.

Gulati et al., "PARDA: Proportional Allocation of Resources for Distributed Storage Access," (Research Paper), 7th USENIX Conference on File and Storage Technologies, vol. 9, Jun. 1, 2009, pp. 85-98.

Azad Soni, "Clustering with Gaussian Mixture Model," available online at <https://medium.com/clustering-with-gaussian-mixture-model/clustering-with-gaussian-mixture-model-c695b6cd60da>, Dec. 5, 2017, 5 pages.

Cory Maklin, "Gaussian Mixture Models Clustering Algorithm Explained," available online at <https://towardsdatascience.com/gaussian-mixture-models-d13a5e915c8e>, Jul. 15, 2019, 20 pages.

* cited by examiner

Latency Table

| CLUSTER | SYS.ENT | SAMPLE ENT. | 90% | 91% | 92% | 93% | 94% | 95% | 96% | 97% | 98% | 99% |
|---|---|---|---|---|---|---|---|---|---|---|---|---|
| 0 | 68 | 32707 | 2.13 | 2.34 | 2.58 | 2.94 | 3.41 | 4.04 | 5.06 | 6.52 | 9.88 | 12.36 |
| 1 | 118 | 382415 | 1.31 | 1.4 | 1.5 | 1.62 | 1.78 | 2.0 | 2.32 | 2.82 | 3.57 | 6.22 |
| 2 | 59 | 11427 | 2.7 | 2.95 | 3.3 | 3.72 | 4.43 | 5.73 | 9.7 | 10.26 | 94.10 | 148.89 |
| 3 | 40 | 11301 | 12.01 | 12.7 | 13.55 | 14.92 | 16.26 | 17.83 | 19.66 | 21.75 | 25.0 | 27.7 |
| 4 | 86 | 52449 | 1.84 | 1.99 | 2.14 | 2.3 | 2.5 | 2.83 | 3.39 | 4.46 | 6.6 | 17.3 |
| 5 | 11 | 1012 | 14.62 | 15.43 | 16.77 | 20.16 | 21.66 | 23.62 | 25.16 | 26.95 | 28.26 | 29.4 |
| 6 | 38 | 3678 | 5.74 | 6.28 | 7.19 | 8.63 | 10.00 | 11.50 | 13.04 | 15.12 | 18.65 | 21.95 |
| 7 | 108 | 69835 | 1.39 | 1.48 | 1.59 | 1.74 | 1.93 | 2.24 | 2.77 | 3.56 | 4.8 | 7.61 |

FIG. 2

Outlier Table (CPU Cores)

| TIME | NORM.MEDIUM | NO. OF OUTLIER | SCORE / TAG |
|---|---|---|---|
| 00:05 | 0.357 | 3% | Moderate |
| 00:10 | 0.392 | 3% | Moderate |
| 00:15 | 0.535 | 4% | High |
| 00:20 | 0.642 | 4% | High |
| 00:25 | 0.892 | 5% | Very High |
| 00:30 | 1.000 | 6% | Very High |
| 00:35 | 0.321 | 10% | Moderate |
| 00:40 | 0.25 | 10% | Moderate |
| 00:45 | 0.000 | 0 | Normal |
| 00:50 | 0.000 | 0 | Normal |
| 00:55 | 0.392 | 10% | Moderate |
| 01:00 | 0.535 | 15% | High |

FIG. 6

Periodicity Table

| PERIOD | NO. OF SYSTEMS |
|---|---|
| 0–0.5 | 17 |
| 1 | 47 |
| 2 | 1 |
| 3 | 1 |
| 4 | 4 |
| 6 | 10 |
| 7 | 4 |
| 8 | 7 |
| 9 | 1 |
| 11 | 2 |
| 12 | 7 |
| 13 | 1 |
| 14 | 2 |
| 15 | 4 |
| 23 | 11 |
| Inf | 1 |

FIG. 8

Latency Probability Table

| WORKLOAD VALUE | WORKLOAD FINGERPRINT | PROBABILITY | NO. OF SAMPLES |
|---|---|---|---|
| 0 | 2 | 86.2% | 387088 |
| 1 | 0 | 62.15% | 118673 |
| 2 | 4 | 56.1% | 34555 |
| 4 | 5 | 52.1% | 27752 |
| 8 | 7 | 55% | 4518 |
| 10 | 6 | 43.3% | 120 |
| 12 | 6 | 66.8% | 36 |
| 14 | 6 | 66.6% | 9 |
| 16 | 6 | 50% | 2 |
| 18 | 6 | 100% | 2 |

FIG. 9

STORAGE SYSTEM LATENCY EVALUATION BASED ON I/O PATTERNS

CROSS-REFERENCE TO RELATED APPLICATIONS

This application claims the benefit of Indian Appl. No. 201841016313, filed Apr. 30, 2018. This application is incorporated herein by reference in its entirety to the extent consistent with the present application.

BACKGROUND OF THE INVENTION

In data storage networks, latency is the amount of time required or used by a storage device to respond to or service a data request, such as an Input/Output (I/O) request. A higher or longer than usual latency time indicates a performance degradation on the data storage network experienced by the application using the data storage network. Conventional data storage network performance evaluation processes measure latency times to determine if the data storage network is experiencing performance degradation. However, conventional latency-based performance evaluation methods have shown to be highly inaccurate, as data storage network performance is impacted by a plurality of factors other than just latency times. More particularly, data storage network performance is known to depend on various characteristics of the application workload of the data storage network, such as the size of I/O requests, CPU saturation, port saturation, disk saturation, queue depth, and cache misses, for example. Therefore, conventional latency-based performance evaluation methods for data storage networks are prone to yield inaccurate results and falsely indicate performance degradation. Thus, a challenge for data storage networks and administrators thereof is how to accurately identify if there is a performance issue in the storage environment, and if a performance issue is identified, the likely cause of the performance issue. Another challenge with conventional data storage networks is identifying the root cause of latency-based performance degradation, as conventional latency-based performance evaluation techniques are not capable of analyzing or otherwise determining factors that may be causing latency issues. Further, conventional latency-based network performance evaluation methods are not able to offer insight into upcoming network latency issues, which would be desirable for network administrators in managing network activity.

BRIEF DESCRIPTION OF THE DRAWINGS

So that the manner in which the recited features, advantages and objects of the present disclosure may be understood in detail, a more particular description may be had by reference to the example embodiments thereof illustrated in the appended drawings. It is to be noted, however, that the appended drawings illustrate only typical or example embodiments of this disclosure and are not to be considered limiting of its scope.

FIG. 2 illustrates an example latency table for eight data clusters or workload types.

FIG. 6 illustrates a chart of the results of a MAD operation, outliers, and the median values of constructs, namely the CPU groups.

FIG. 8 illustrates an example periodicity table.

FIG. 9 illustrates a table of the workload value distributed into equal sized bins and the actual corresponding workload fingerprint.

DETAILED DESCRIPTION

Figure 1:
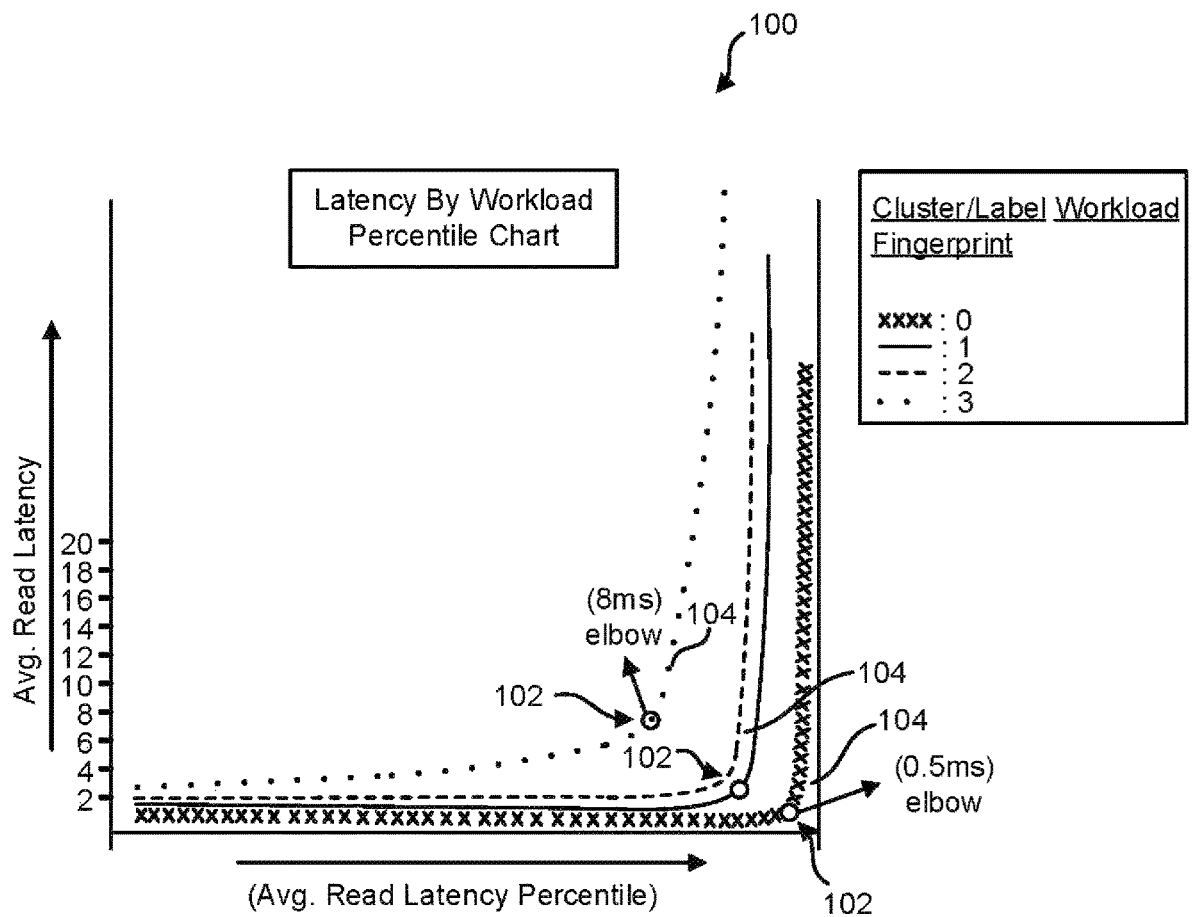
FIG. 1 illustrates an example plot of clustering algorithm results used to identify latency thresholds in a data storage network.

In the following, reference is made to examples or embodiments of the described concepts in this disclosure. However, it should be understood that the described concepts are not in any way limited to examples or embodiments described herein. Instead, any combination of the following features, elements, or functionalities, whether related to different embodiments or not, is contemplated by the inventors as a possible combination that may be used to implement and practice aspects of the present disclosure. Furthermore, in various embodiments described in this disclosure provide numerous advantages over the prior art. However, although embodiments of the disclosure may achieve advantages over other possible solutions and/or over the prior art, whether or not a particular advantage is achieved by a given embodiment is also not intended to be limiting on the scope of the disclosure. Therefore, the following aspects, features, functionalities, embodiments, and advantages are intended to be illustrative and are not considered elements or limitations of the appended claims, except where explicitly recited in a claim. Similarly, any reference to the "invention," "innovation," "inventive concept," etc. is not be construed as a generalization of any inventive subject matter disclosed herein and shall not be considered to be an element or limitation of the appended claims except where explicitly recited in a claim.

Embodiments of the disclosure provide a system, method, and software program to reliably capture, identify, and score a workload for a data storage network, where the workload is generally defined as a set of I/O characteristics running through a group of machines that interface with network and storage infrastructures. The method or software of the present disclosure may continuously and in an unsupervised manner capture data storage network workload metrics in a machine learning process, whereby the captured data storage workload metrics may be classified into known patterns that may be used to score, as described further herein, current and future I/O operations of data storage networks. The data storage workload metrics used to evaluate data storage network performance may include, for example, latency, I/O counts recorded, read/write ratio, cache hit percentage, CPU usage, CPU saturation, cache saturation, back end disk saturation, disk port saturation, front end port saturation, queue depth, I/O size, cache miss, CPU busy, cache hit/miss, and other parameters known in the art to have an impact on data storage network latency. The scored data storage workload metrics provide a measure of the I/O latency for the data storage network that can be compared to previously captured and scored metrics, also referred to as historical metrics, from across an install base of similar data storage networks to evaluate performance degradation in the data storage network.

These scored data storage workload metrics can also be used as inputs to performance and health dashboards of the data storage network manageability software graphical user interface so that the scored learning information may provide a near real-time view of the performance and/or health of various aspects of a data storage network. This scored learning information, when compared to historical data storage network metrics, is advantageous to the data storage network administrator in resolving performance issues, as the scored learning information when compared to historical data storage network metrics can help the administrator determine the actual cause of latency in the data storage network. Health and performance dashboards generated by comparison between the historical scored workload metrics compared to current data storage network metrics is also advantageous to storage network administrators in making network critical decisions on scheduling resource intensive storage or other data storage network intense operations, such as migration, large data transfers, maintenance, etc.

In an example of the disclosure, a system, method, or software package may operate to extract latency related data parameters or metrics from a data storage network to create a unique historical representation for the data storage network's workload. The extraction process may occur, for example, locally through storage device management software residing on individual data storage devices, on a management computer or server for a data storage network, on controlling or monitoring software associated with a data storage network, in the cloud via monitoring of communications to/from a data storage network, remotely through hardware or software configured to monitor data transmissions to/from a data storage network, or through software applications accessing a data storage network that are configured with sensors or data monitoring capabilities that allow for gathering of data storage network workload metrics needed to evaluate performance of the data storage network. The unique historical representation of the data storage network's workload can be used to compare with recent data storage network workloads or parameters from data storage networks across a larger platform, such as an installed base, to identify performance issues with a data storage network.

Example embodiments of the disclosure provide the capability to generate a unique historical representation of workload patterns for a data storage network by looking at histogram data of the different types of I/Os occurring during a sample interval. Example embodiments of the disclosure may analyze a storage network or system that is conducting an I/O process by comparing a pattern for the current I/O process to unique historical representation(s) of data storage networks to find a corresponding or related historical representation. For the unique historical representation related to a current I/O process being analyzed, if the data service time or latency is "X" in the historical representation, then embodiments of the disclosure may analyze samples collected across the installed base to determine that a service time or latency of "X" lies in a specific latency percentile range, and further, if that percentile range is overloading the current data storage network system. In sum, embodiments of the disclosure may capture a current representation of a data storage network and compare the current representation to a corresponding historical representation representing normal or typical operating parameters to determine if the latency in the current representation is in a normal range that corresponds with acceptable data storage network performance under the specific workload conditions present.

In an example of the present disclosure, a workload fingerprint model is created from the total and average values for storage network data latency metrics over a sampling interval reported in a data structure. The workload fingerprint model may be a multidimensional vector representing a plurality of latency related metrics for a data storage network, where the latency related metrics may include I/O counts recorded, read/write ratio, cache hit percentage, CPU usage, CPU saturation, cache saturation, back end disk saturation, disk port saturation, front end port saturation, queue depth, I/O size, cache miss, CPU busy, cache hit/miss, and/or various other metrics known to or capable of impacting latency in a data storage network. As such, the workload fingerprint model used in this example of the present disclosure may be based on a plurality of parameters related to latency of the data storage network as opposed to conventional data latency performance measuring techniques based only on latency time measurements.

The multi-dimensional vector representing the workload fingerprint model may be represented as a bin histogram or diagram of generally parallel rectangles where the area of the rectangles is proportional to the frequency of a variable and whose width is equal the data class interval. The example disclosure may use the bin histogram to create a labelled point data structure, wherein each point in the labelled point data structure represents a distribution of the number of I/Os of various sizes into several fixed sized buckets, which may be referred to as histogram data for I/O sizes. The bucket sizes may, for example, be selected by relevance to a specific type of data storage latency issue. For example, the sizes may be 1 k, 1-2 k, 2-4 k, 4-8 k, 1-2 m, 2-4 m, and if in a 5-minute interval there were ten I/Os of size 4 k and 5 I/Os of size 128 k, then the labelled point would look like [0, 0, 0, 10, 0, 0, 0, 0, 5, 0, 0, 0 . . . ]. Additional metrics, such as the number of "Read" and "Write" I/Os and/or the number or ratio of reads and writes that hit or miss cache may also be factored into the labelled point data structure. For example, if in a 5 minute interval there were twenty read requests and thirty write requests, the ratio of the reads to writes i.e. 20/30=0.66 is added an an additional parameter to the labelled point. Also, during the same 5 minute interval, if five of the read requests and ten of the write requests were were served from the cache, 5/20=0.25 and 10/30=0.33 which are the cache hit ratios for reads and writes are also added an additional parameters to the labelled point. Using the hit/miss ratio, for example, gives an indication of the randomness of the I/O from the measure of how many reads missed the cache memory.

A collection of each of these points across all samples that belong to a storage system and across all samples that belong to the storage systems of the identical class is what forms the known historical data or training data used by the system, method, or software of the present disclosure to compare to and analyze current data storage latency trends or issues in a data storage network. Training to obtain training data or historical data may generally be defined as collecting data to support creating an equation or a transfer function capable of recognizing similar or recurring patterns in the data.

A clustering algorithm, such as a k-means clustering algorithm, may be run on the labelled point data structure or training data with the cluster size set to eight to yield eight clusters of workload types that are the workload fingerprints. K-means clustering is known as a mathematical method of vector quantization that is used for cluster analysis in data mining, where k-means clustering aims to partition "n" observations into "k" clusters in which each observation belongs to the cluster with the nearest mean serving as a prototype of the cluster. This essentially results in a partitioning of the data space into Voronoi cells with clusters of comparable spatial extent. As an example, Voronoi diagrams are a partitioning of a plane into regions based on distance to points in a specific subset of the plane. That set of points, typically called seeds, sites, or generators, is specified beforehand, and for each seed there is a corresponding region (Voronoi cell) consisting of all points closer to that seed than to any other. Other cluster sizes greater than or less than eight are contemplated to be used with the k-means clustering algorithm, however, experimental data suggests that setting the cluster size to eight unexpectedly yields optimal results with minimal overhead for data storage networks. Running the k-means clustering algorithm yields eight data clusters each of which is a workload type that may be referred to as a workload fingerprint. Optionally, the example embodiment may use an alternative clustering algorithm, such as a Gaussian mixture model, to run on the labelled point data structure, assuming the Gaussian model is set to the labelled point data structure distribution.

After running a clustering algorithm, each resulting cluster will contain a plurality of samples, some clusters having more samples that the others. In an example data analysis 100 shown in FIG. 1, clusters derived from 600,000 samples across 120 storage systems are shown in a plot of the latency percentile values across all the samples against the latency values for each Read or Write operation for each of the clusters. The four plots of FIG. 1 show each of the latency percentiles having a gradual slope increasing from left to right until encountering an elbow 102 where the latency percentiles increase to a near vertical slope, as shown at 104. The location of the elbow 102 in the plot indicates a latency threshold for each of the four types of workload types. Thus, the majority of the I/O operations for each specific workload type were serviced in time that is less than or below the identified elbow 102. The elbow locations can therefore be used to determine a threshold that delineates a boundary between normal and high latency for a specific workload, i.e., high latency is above or right of the elbow/threshold and normal latency is below or left of the elbow/threshold.

Once the latency thresholds have been identified, a latency table may be generated for each workload type or cluster. FIG. 2 illustrates a latency table for the eight data clusters or workload types from the clustering algorithm. The table illustrates the different latency thresholds for each workload fingerprint identified by the eight clusters, the number of systems, and the number of samples that belong to each cluster in the training data. The latency percentile plot and the latency table provide the foundational benchmark for real time comparison and analysis of incoming data storage fingerprints.

Once the latency table and the latency percentile plot have been created for the data storage network, the example embodiment may monitor incoming samples/labelled points over a sample time period and classify the incoming data into clusters, workload fingerprints, and workload types. Therefore, the example embodiment may be deployed onsite in a data storage network within the data storage unit management software on the local storage units. The management software may record and classify each new incoming sample or labelled point from the storage system in real-time. The samples are collected by or otherwise transmitted to the method, system, or software of the present disclosure and the trained k-means algorithm is applied to classify each sample into a specific cluster, workload fingerprint, and workload type, and the latency value recorded for the sample is used to assign a score to the sample depending on which column of the latency table it satisfies or fits in. For example, if the sample belongs to cluster 1 and the latency is between 1.31 and 1.4, the sample is assigned a score of 1, similarly, if it falls in the 91% column, it gets a score of 2. The scoring is based on the position in the table the value lies in, e.g. the scoring begins from the 90% mark. Values that lie in the 90% mark get a score of 1, the ones that lie in the 91% mark gets a score of 2 so on an so forth. Therefore, a value that lines in mark 98% gets a score of 9 and the values that lie in 99% mark gets the highest score of 10.

Example embodiments may use time series correlation on the data to identify which factor(s) primarily contribute towards the observed latency during a specific interval of interest. The measured latency of the samples that have a score greater than zero may be correlated with the observed values of the other relevant factors in the storage system. Example factors include CPU saturation, cache saturation, back end disk saturation, disk port saturation, front end port saturation, queue depth, I/O size, cache miss, CPU busy, queue depth, cache hit/miss, and other parameters known to have an impact on data storage network latency. The factor with the highest correlation coefficient is determined to be the highest probability of being the primary factor causing the high latency. An example list of factors ordered by the correlation coefficient shows which of the factors are the likely contributors towards the observed latency is shown in FIG. 3.

The time series correlation may be used to determine what factors are contributing to latency by looking at what correlating factors increase or decrease with the observed latencies. Essentially the correlation method measures the potential contributing factors over the defined period of time and correlates with the matrix reported by those factors and latency values at specific points during the period. Using the correlation, a duly weighted approach may be applied to determine how much of the latency or the service time at a particular point of time correlates with the identified contributing factors that were determined to be occurring at the same time as the observed latency.

Different data storage networks use different hardware and software, and further, within a data storage network, it is common to see different software and hardware. In an example system there may be five storage systems, each running different software applications, such as Oracle, VMWare, SQL, Tapana, etc. When a conventional latency monitoring method looks at the I/O patterns that the storage system sees for these different applications, it would not be able to accurately identify latency factors, as each software application has a different workload fingerprint. The present method and software overcomes this disadvantage by using an unsupervised learning technique discussed above to create buckets of distinct workload fingerprints, which are not application specific, but rather represent different types of I/O patterns reflective of latency contributing factors present in various applications. Therefore, although all data storage network management software packages or data storage units do not include software to generate the data metrics needed to accurately identify factors directly contributing to latency, embodiments of the disclosure are capable of looking for distinct patterns in data storage networks that can identify latency factors irrespective of the underlying software application of the data storage network.

Figure 3:
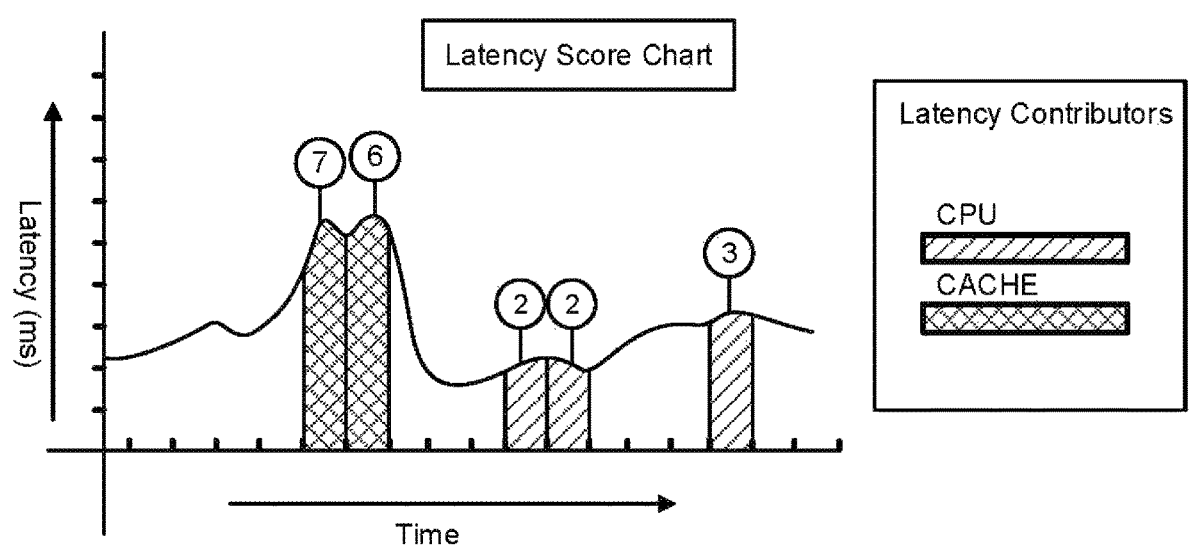
FIG. 3 illustrates an example list of factors ordered by correlation coefficients to show likely contributors to observed latencies.

Returning to the Latency Table illustrated in FIG. 3, the example method or software of the disclosure determines that if a storage system is doing an I/O pattern which belongs to workload fingerprint A, for example, and if the service time is X, then the method or software is able to determine by analyzing the samples collected across the installed base that X service time lies in a specific percentile value from the latency table in FIG. 3. The example method or software would generally determine that for the sample that is overloading the system or causing latency above the identified threshold value, the latency that was experienced by or during servicing of this workload fingerprint A was at the 95th percentile or higher, which also indicates that it is an outlier when compared to the latencies of the same bin. As such, example embodiments of the disclosure are capable of identifying outliers by using the latency threshold and percentile values.

Figure 4:
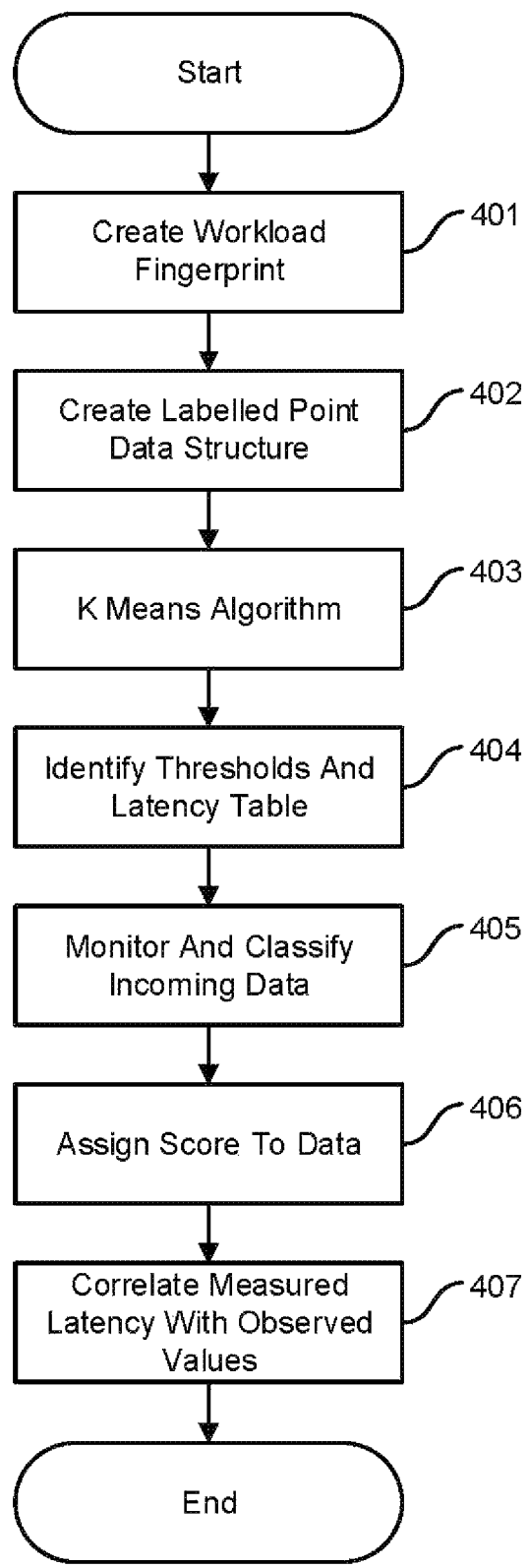
FIG. 4 illustrates an example method for identifying latency factors in a data storage network.

FIG. 4 illustrates an example method for identifying latency factors in a data storage network. The method begins at 401 where a workload fingerprint model is created using total and average values for data latency metrics. The method continues to 402 where a labelled point data structure is created, wherein each point of the data structure represents a distribution of the number of I/Os of various sizes into fixed sized buckets, which are then represented by histogram data. The histogram data may include additional factors (noted above) such as the I/O read/write ratio, cache hit percentage, etc. The method continues to 403 where a clustering algorithm, such as a k-means or Gaussian clustering algorithm, is run over the labelled point data structure with the cluster size set to, for example, eight to yield eight clusters of workload types that represent the workload fingerprints. At 404 the method may identify thresholds for high latency for each identified cluster or workload type and generate a corresponding latency table. Method blocks 401-404 may be used to generate historical or trained data, i.e., workload fingerprints, for use in analyzing incoming data to identify latency issues in a data storage network.

Figure 5:
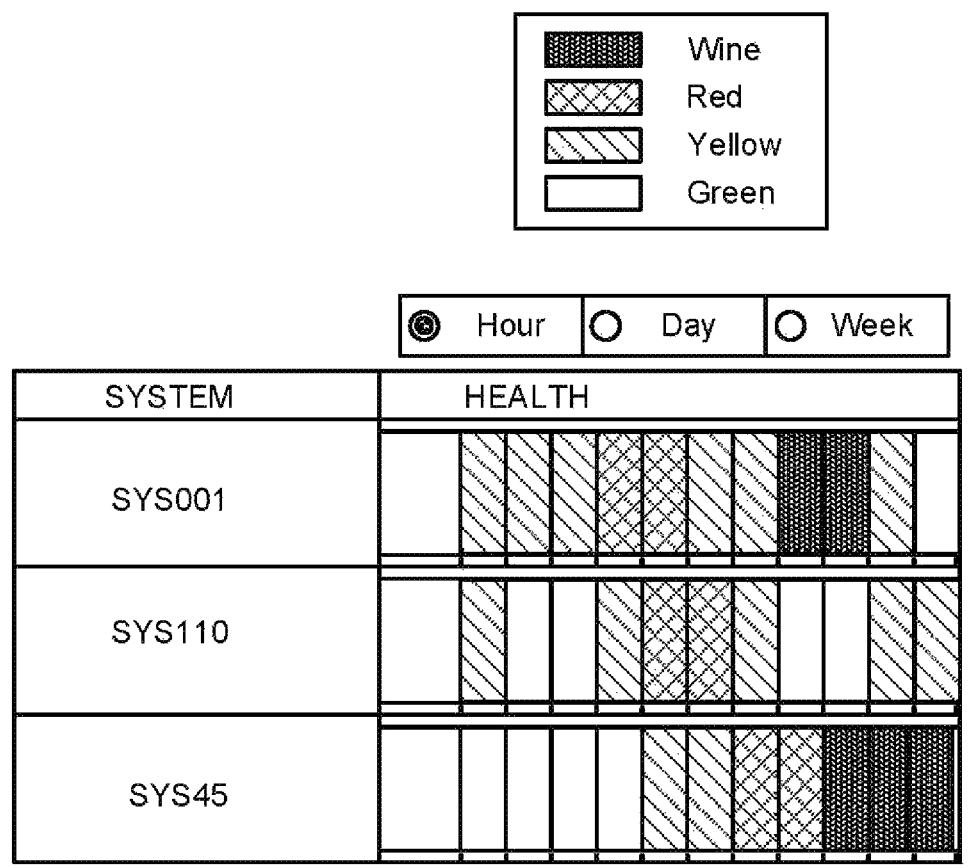
FIG. 5 illustrates an example health score chart generated by a method or software of the present disclosure.

At 405 the method monitors incoming samples/labelled points for a data stream to be analyzed over a sample time period and classifies the labelled points into clusters, workload fingerprints, and/or workload types. At 406 the incoming data to be analyzed is assigned a score using the recorded latency value based on the latency table. At 407 the method correlates measured latency with observed values (and other factors) that are identified as contributors to latency to create a latency score chart that identifies the factors contributing to data storage network latency. Thus, at 406 and 407 the method compares the measured metrics of the data stream to be analyzed to the recorded historical or trained data (historical workload fingerprints) to identify factors contributing or causing latency in the data storage network. The data captured from a particular storage device or network may be periodically run through the above noted method and have each iteration or observation classified and scored in accordance with 400-407. These scores are then used to identify representative periods of "red", "yellow" and "green" that indicate the health of the system using performance as an indicator, wherein an average score of 1-4 may be categorized as "yellow", 4-7 as "red," and 7-10 as "wine", as shown in FIG. 5. The observations at the granularity of 5-minute intervals may be rolled up and averaged at the hourly level, which may then be rolled up at the day and week level as desired by the user. Thus, example embodiments of the disclosure are capable of providing performance scores for a data storage network using various test or sample intervals, including by minute, hourly, daily, weekly, monthly, etc.

In data storage networks, performance issues are nearly always caused when the storage system is subjected to a larger workload than what it was designed or sized for. However, there are also a significant percentage of scenarios where the performance issues in a data storage network are a result of a misconfigured system or bugs in the data storage network operating software. Example embodiments of the disclosure identify anomalies in a data storage network that indicate the presence of a misconfiguration or bug in the data storage network management software.

Example embodiments of the disclosure may use statistical methods to identify outliers or anomalies in the data storage network latency metrics. A statistical method used to identify outliers may be an absolute deviation mathematical operation. Similarly, the statistical operation of median absolute deviation (MAD) may be used to identify outliers or anomalies in the data storage network latency metrics reported by the groups of objects that form logical constructs in a storage system. Example logical constructs include volumes, disks, disk ports, CPU cores, etc. Example embodiments of the disclosure can detect if there are outliers in the metrics reported by any one of the groups. In statistics, the median absolute deviation is a measure of the variability of a univariate sample of quantitative data. For a univariate data set $X_1, X_2, \ldots, X_n$, the MAD is defined as the median of the absolute deviations from the data's median: MAD=median($|X_i$–median(X)$|$, therefore, starting with the residuals (deviations) from the data's median, the MAD will yield the median of the data set's absolute values. Example embodiments of the disclosure report the MAD value, the number of samples beyond three times the MAD value, which are the sought-after outliers, and the median value of the outliers. If the group of objects in a logical construct share the load equally, there would typically be no outliers, but if one of the objects in an object group is more saturated than others, the higher outlier count and the median of the outlier would provide a data indication using the MAD that the logical construct has an imbalance due to a misconfiguration or a software bug identified by the outlier. A chart illustrating the results of a MAD operation, outliers, and the median values of constructs, namely the CPU groups in the present example, is shown in FIG. 6.

Figure 7:
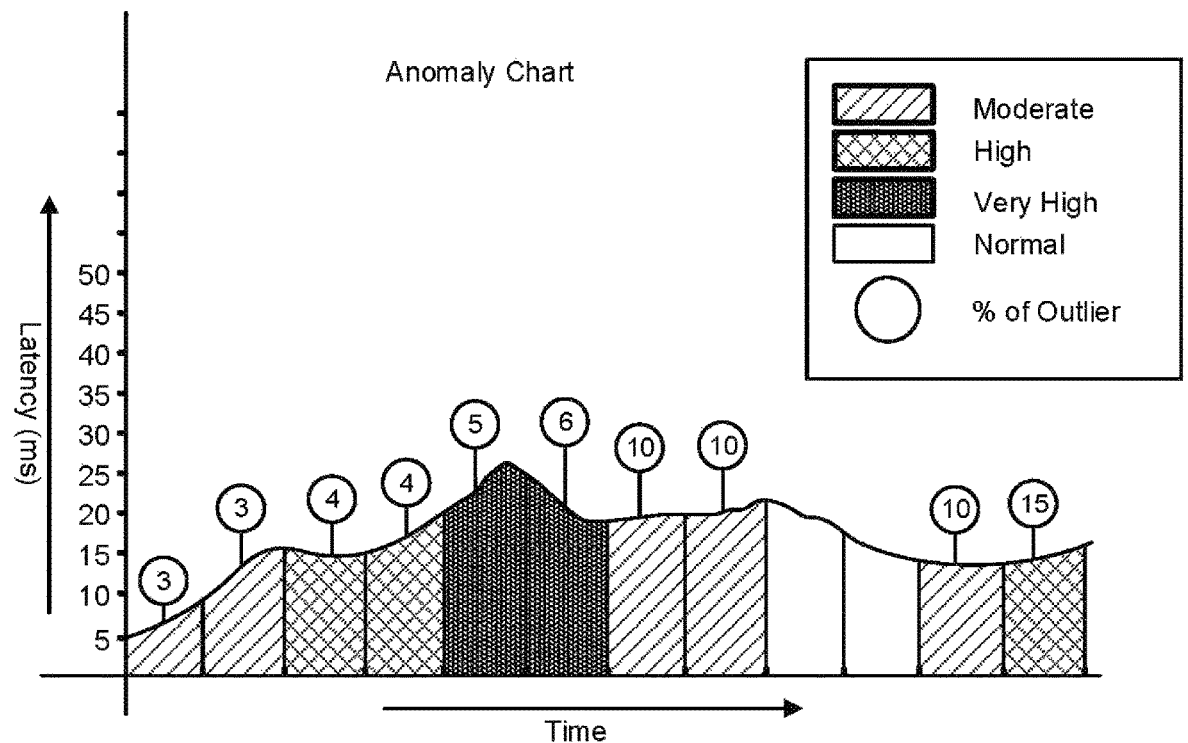
FIG. 7 illustrates an example graph to visualize outlier influence.

Example embodiments of the disclosure may generate a summary of the anomalies detected by using the MAD and this summary can be reported against the performance chart for the data storage network for the period of interest. The anomaly will typically be present over all the sample time observations across the period of interest, so an average percentage of outliers per sample and the average median value is reported in the summary to provide an overview of the influence of outliers on performance. For a specific period of interest, the median values are normalized in the range 0-1 so that it is straight forward to score or tag them based on intuitive thresholds. As an example, normalized median between 1-4 may be assigned a score/tag of "moderate," a normalized median of 4-7 may be assigned a score/tag of "high," while a normalized median of 7-10 may be assigned a score/tag of "very high" for anomalies, as shown in FIG. 6. Each sample observation may have a different influence of outliers and the method or software of the present disclosure uses the median values as scores to differentiate the influence factors and to visualize the difference by using, for example, various shades or colors on the latency chart, as shown in FIG. 7. The percentage of outliers are displayed over each visible sample observation range on the chart for use in managing and maintaining the data storage network.

Example embodiments of the disclosure may analyze the data based on whether it is high, moderate, or normal from the table in FIG. 6 to generate the anomaly representation chart in FIG. 7. The anomaly chart provides the user with a call out tool that may allow mouse overs to display the corresponding anomaly cause and associated metrics. The scores illustrated in FIG. 7 may be considered the percentage of the outliers. When the user views this information, they see the peaks at, for example, time equals five and six in the chart. At times five and six, there is a spike in latency and the shading indicates to the user that the influence of the anomalies on outliers was significantly high during this region when compared to the other regions. This provides the user with an indication to the next aspect of performance troubleshooting at the specific component or software level, as the latency at times five and six was high and the primary influence of anomalies during this period of time was CPU scores. Without the graphical representation of FIG. 7, the user would have to go look at the work matrix recorded by the system at each different point in time through the correlation, manually find the outliers, and manually try to correlate the outliers with the cause factor, which may take an excessive amount of time to accomplish.

Figure 14:
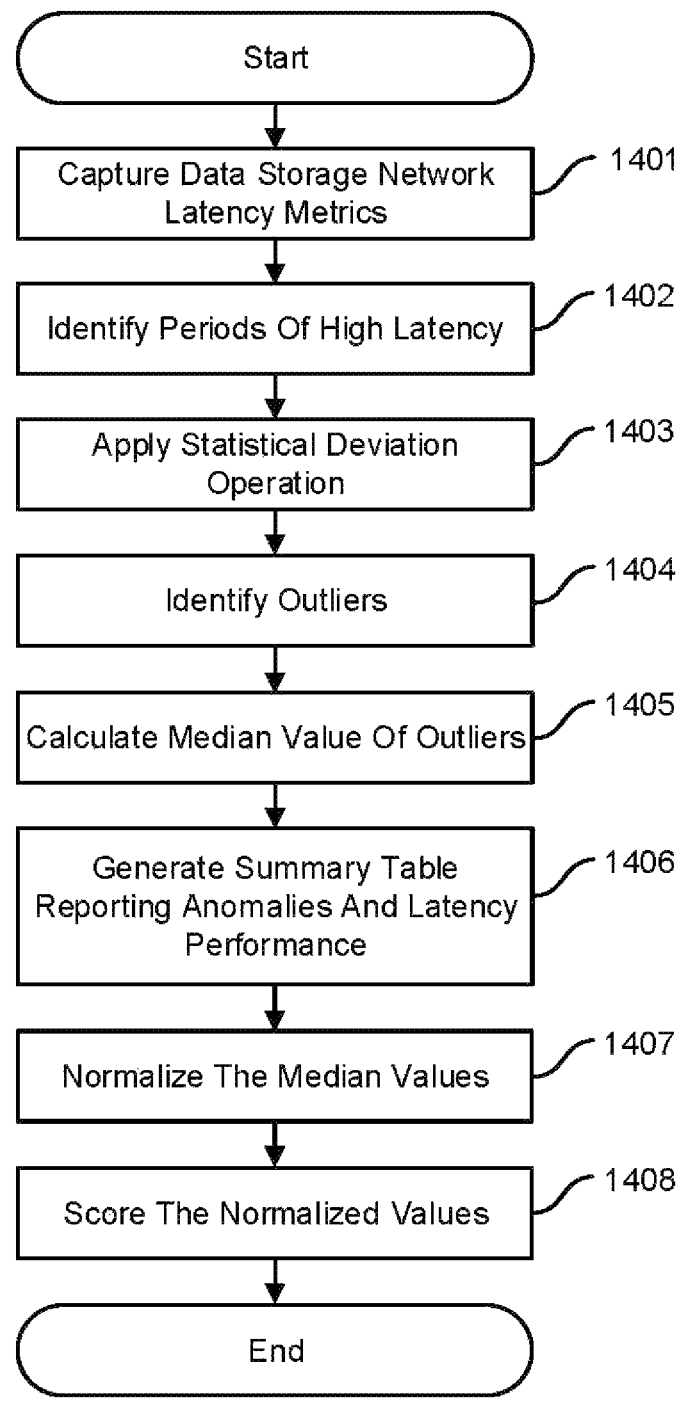
FIG. 14 illustrates an example method for identifying outliers in data storage network latency metrics that may be contributing to latency performance in a data storage network.

FIG. 14 illustrates an example method for identifying outliers in data storage network latency metrics that may be contributing to latency performance in a data storage network. The method begins at 1401 where the data storage network metrics are captured. The metrics are generally recorded by the individual drives in the data storage network, for example, by the management software present at the drive. Metrics may also be captured by other devices, sensors, or processors external to the individual drives and through various networks or the cloud (e.g., remote computing system(s)). Example metrics used to determine anomalies may include latency times, number of or types volumes, number of or types disks, number of or types disk ports and their usage percentage, CPU scores, application workloads, etc. Once the data storage network metrics have been captured, the method may continue to 1402, where periods of high latency are identified. The process of identifying periods of high latency may be accomplished via any of the methods noted herein, such as the example method described with reference to FIG. 4.

At 1403 a statistical deviation algorithm, such as a MAD, may be applied to the data storage network latency metrics around the identified periods of high latency. Applying the MAD operates to statistically identify outliers in the metrics reported by the data storage network and/or the individual drives in the data storage network. In another example, applying the MAD operates statistically identify the outliers in the groups of objects that form the constructs in the data storage network system. Once the statistical deviation algorithm has been applied, the method continues to 1404 where all samples beyond 3 times the calculated statistical deviation are identified. For example, at 1404 all samples having a value that is equal to or greater than 3 times the statistically calculated MAD value are identified as outliers in the data set. At 1405 the median value of the samples identified as being equal to or greater than 3 times the MAD, which are the outliers in the data, is calculated.

As noted above, when the load is shared equally in the data storage network, there will not be any outliers identified, as all of the data samples would yield a MAD that is less than 3 times the statistical deviation. However, when one of the objects in an object group is more saturated than others, then the outlier count from the statistical deviation and the calculated median of the outlier count provides an indication that the logical construct likely has an imbalance due to a misconfiguration or a software bug. Therefore, as discussed with respect to the Outlier Table illustrated in FIG. 6, at step 1406 the method may optionally generate a summary table of the anomalies detected in the metrics and report this data against performance for the sample interval or period of interest to illustrate the comparison to a data storage network administrator. The summary table may include a calculated score or grade of the severity of the outliers, as shown in the right column of the table FIG. 6 as normal, moderate, high, very high, etc. This table is useful for data storage network administrators to visualize anomaly relevance and importance. The method continues to step 1407 where the calculated median values during the sample duration are normalized in the range of 0-1. This normalization allows the example method to score or tag the values based on predetermined thresholds, which may be normal, moderate, high, and very high as noted above in the discussion following FIG. 6 on normalization.

Figure 11:
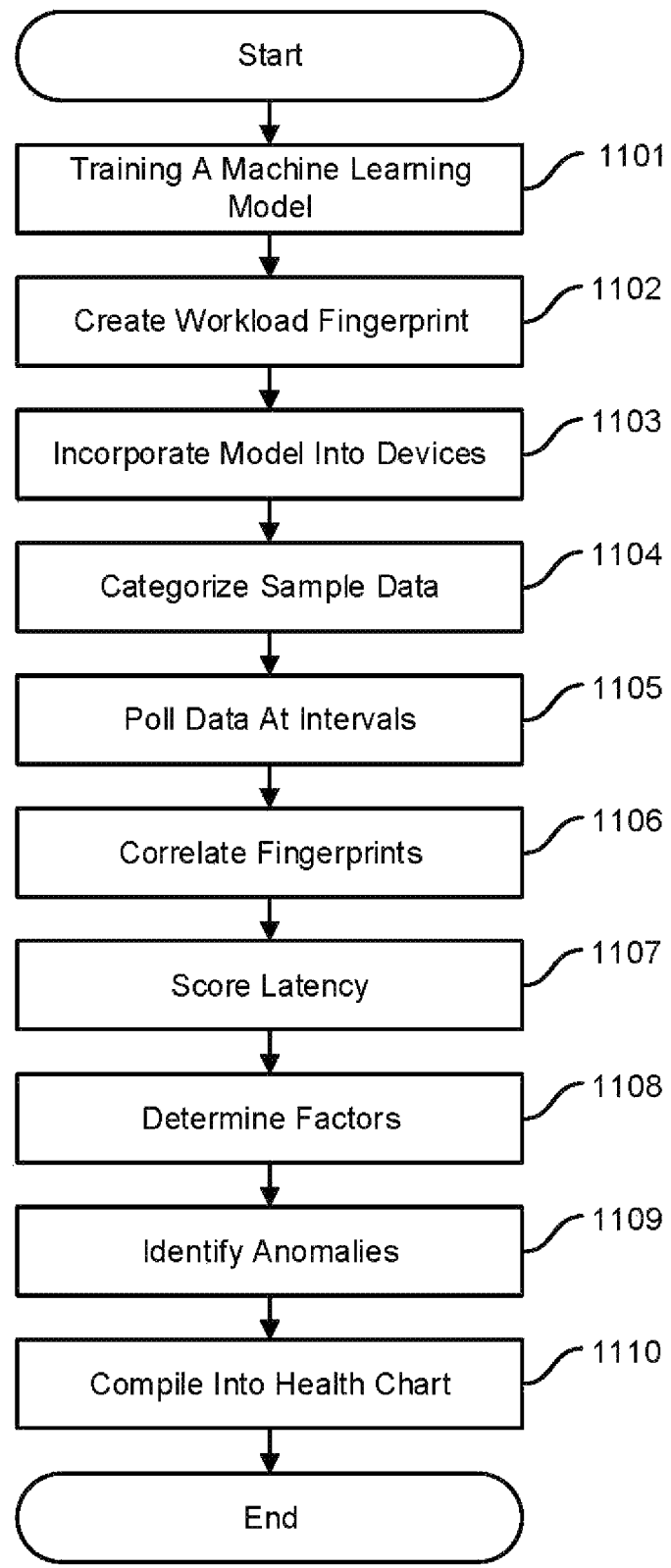
FIG. 11 illustrates an example method for identifying latency anomalies in a data storage network.

FIG. 11 illustrates an example method for identifying latency anomalies in a data storage network. In 1101, the method includes training or generating from data capture over a data storage network installed base a machine learning model of latency metrics. In 1102 the method creates a trained workload fingerprint model, as discussed above, for the trained metrics. The trained workload fingerprint model represents latency characteristics of the data storage network installed base. Further, as described above, a latency table corresponding to the workload fingerprint model may also be generated. In 1103 the trained workload fingerprint model is incorporated into storage devices, packaged, and shipped with the storage management or control software of individual storage devices. Alternatively, the trained workload fingerprint model may be incorporated into data storage device management computers, servers, networks, or other devices or systems that manage communications to and from a data storage device. In 1104, the management software analyzes real time or recent local sample data from the storage device or system associated with the management software and categorizes the sample data into one of the trained workload fingerprint models. In 1105, the management software may continually poll data from the storage device at predetermined intervals, such as every minute or every five minutes, where the polling includes pulling the data as recorded by the system of the different kinds of I/Os that the system has serviced during the sampling interval and classifying the polled data into the trained workload fingerprint models.

In 1106, the classified data or fingerprint models for the current I/O are correlated with percentile scores for latencies, which may also be included as part of the software control methodology shipped with the management software for the storage device being analyzed, and as such, this correlation may take place locally in the management software. In 1107 the method determines the latency that was reported by the storage device at a particular point in time and scores it with the latency table generated along with the workload fingerprint model. In 1108 once it is identified that the system is experiencing a latency problem, the method continues to break the latency problem down by identifying the contributing factors through a latency score chart. In 1109 once the factors contributing to latency are identified, the method identifies the anomalies, such as an imbalance in the way the CPU cores are distributing the workload or how the back-end ports are distributing the workload. In 1110 the method may compile this information into a health chart for presentation to the user.

Example embodiments of the present disclosure may use portions of the methods already described herein to predict future data storage network workload patterns and periods of high latencies. An example embodiment of the disclosure is configured to classify data center workloads into workload patterns or workload fingerprints that can be compared to historical patterns or fingerprints to identify anomalies. Example embodiments of the disclosure, using historical workload fingerprint data, may also predict and forecast which specific future time periods are likely to be dominated by a specific workload fingerprint. To accomplish this prediction, example embodiments of the disclosure first approximate a workload fingerprint by a workload value, which is a continuous random variable in preparation for a time series analysis to be run thereon. Example embodiments of the disclosure may use principal component analysis (PCA) to determine the projection of a labelled point along the first principal component as the approximation of the labelled point, and hence an approximation of the workload fingerprint, which is the "workload value." The PCA model is generally trained in the cloud using samples from several systems across the entire install base and then deployed in local storage management software to execute predictive functions.

Example embodiments of the disclosure use PCA to generate an approximation of the workload fingerprint. For example, the workload fingerprint may be a sixteen-dimension vector wherein the first fourteen components of the vector may represent the bins/buckets that describe the number of I/Os of a particular size recorded during the sampling period, i.e., 512 b, 1 k, 2 k, 4 k, 8 k, 16 k, 32 k, 64 k, 128 k, 256 k, 512 k, 1 m, 2 m, and 4 m. The fifteenth and sixteenth components of the sixteen-dimension vector may represent the read/write and cache hit percentage. The following are example data vector representations:

2017-11-15 01:30:00 125343 175025 38860 418705 1097010 379141 69739 164494 592364 217616 531677 203831 0 0 6.5 35

2017-11-15 01:35:00 212623 193538 48574 668882 1448122 445723 152965 191030 793793 301458 209243 85818 0 0 5.7 32

The example vector data shows, for example, that on Nov. 15, 2017 at 01:30:00, there were 175,025 I/Os of size 1 k (1,024 bytes) (i.e., represented by the data "175025" in the second component of the vector) and 379,141 I/Os of 16 k that were recorded (i.e., represented by the data "379141" in the fifth component of the vector). The ratio of number of reads to writes was 6.5 (i.e., represented by the data "6.5" in the fifteenth component of the vector) and the 35% of I/Os were serviced from cache memory (i.e., represented by the data "35" in the sixteenth component of the vector). The example vector data representation illustrates a number of example parameters that may be used in a representative data storage network vector, however, the vector may include any parameter related to data storage network latency, and the example embodiments described herein are not limited to the parameters illustrated in the example vectors. The disclosure may approximate this sixteen-component vector to a numerical value represented by the variable called the "workload value". This is done using PCA, which generally operates to reduce the dimension of the workload fingerprint vector from sixteen to one by linear mapping of the data to a lower-dimensional space in such a way that the variance of the data in the low-dimensional representation is optimized.

In mathematics, dimension reduction is the process of reducing the number of random variables under consideration by obtaining a set of principal variables. Dimension reduction generally falls into either feature selection or feature extraction methodologies. Feature selection approaches are based on finding a subset of the original variables, which are called features or attributes. Feature extraction approaches are based on transforming the data in the multi-dimensional space into a space of fewer dimensions. PCA is a linear feature extraction approach that may be used to reduce the workload fingerprint to a single dimension workload value. Other linear and nonlinear dimensionality reduction techniques are contemplated for use in reducing the workload fingerprint vector to a workload value.

In an example embodiment, the PCA dimensionality reduction may be a linear transformation function that the example embodiment of the disclosure trains in the cloud. The example embodiment may then use samples from the community to learn or determine what the linear transformation function should look like, which is, for example, what PCA for dimensionality reduction accomplishes. The linear transformation function may be packaged into the code of the management software for an individual or group of data storage elements, which is then used to predict (transform a sample and predict the workload value) in real time for data storage arrays being managed.

In example embodiments of the disclosure, the time series data where each time sample has a corresponding "workload value" is used to study the periodicity. The inventors have found that over 40% of the storage arrays studied in the field have a one-day periodicity and over 75% of the storage systems in the field exhibit some form of periodicity (hourly, daily, weekly, etc.), as shown in the example periodicity table of FIG. 8. The existence of periodicity in workloads of data storage arrays indicates that it is possible to reliably predict and forecast a workload that would be subjected to the storage array in advance of the workload happening, i.e., forward looking predictive data storage system metrics for latency, workloads, etc.

To provide this predictability, example embodiments of the disclosure use the PCA model and the k-means model (the workload fingerprinting model discussed herein) on the storage array's current metrics, which is used in real-time to generate and assign a current workload fingerprint. This current workload fingerprint again represents the clusters the data samples belong in and there may be any number of clusters, however, the inventors have found that using eight clusters yields an optimal result for data storage network data analysis. The method and software of the disclosure also uses PCA and k-means to generate the corresponding workload value, which represents the approximation of the workload fingerprint, from the projection of the data sample onto the first principal component.

FIG. 9 illustrates an example table of the workload value distributed into equal sized bins and the actual corresponding workload fingerprint. The data for the table in FIG. 9 was generated from a study across a set of 120 similar storage systems. The table of FIG. 9 illustrates that if the workload value is between zero and one, then it is most likely to belong to label zero, i.e., workload fingerprint zero has a probability of 62%. Using this information, the method or software of the disclosure can predict the expected latency known from our latency table for the specific workload fingerprint, e.g. the expected latency for workload fingerprint zero is <2.1 ms, as illustrated in the latency probability table of FIG. 9 and the latency table of FIG. 2.

Figure 10:
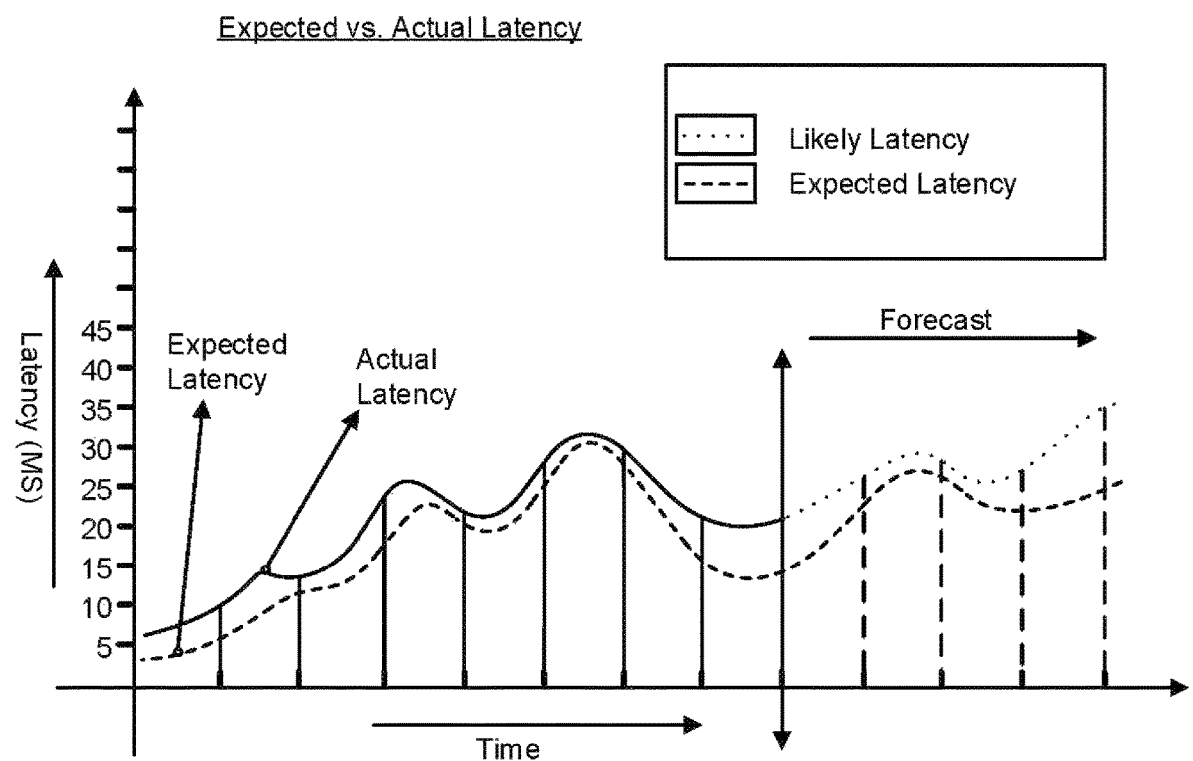
FIG. 10 illustrates an example plot of a data set processed to show actual latency compared with predicted latency.

Therefore, example embodiments of the disclosure are able to forecast the future workload of a data storage network using a time series model based on the workload value of the trained samples. Thus, in the example noted above, the method or software is capable of hypothesizing that there is a 62% probability that the latency between time t1 and t2 is expected to be <2.1 ms. A reliable latency probability table is most readily built when the management software for the data storage network has a chance to observe the data storage network behavior over a reasonable period of time compared to the desired prediction range. For example, if it is desires to predict latency for 2 days from now, then the periodicity through which the data should be collected to support an accurate prediction is at least three to five times the expected periodicity of the data storage network. Therefore, the number of samples per classification is an important parameter in determining if the probability value is accurate and is acceptable for use in predicting latency values. Similarly, the actual latency value as observed over a reasonable period of time, which is typically two or more weeks of normal operation, is also used to forecast the likely latency during specific intervals in the future. In FIG. 10, this value is displayed side by side along the expected latency during the same interval noting that a large deviation between the likely and expected latency is a clear indication of a system behavior that needs further investigation and might also require support intervention.

Figure 12:
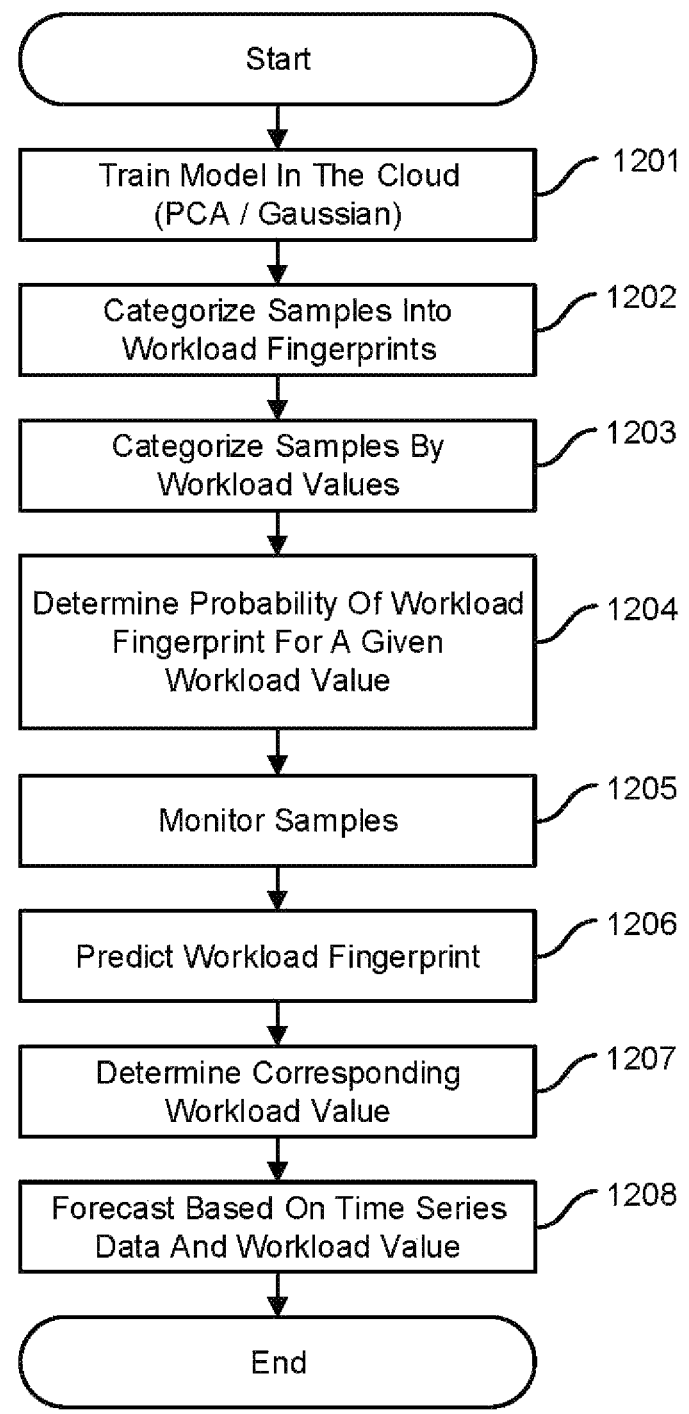
FIG. 12 illustrates an example method for predicting future data storage network workload patterns and periods of high latencies.

FIG. 12 illustrates an example method for predicting future data storage network workload patterns and periods of high latencies. The example method may begin at 1201 with training a latency data model representing a I/Os for the network. The training data durations is expected to be 5-10 times the periodicity of the system in order to generate accurate latency prediction results. The training generally includes categorizing samples into workload fingerprints, as noted at 1202, and determining the corresponding workload value for each workload fingerprint, as noted at 1203. Further, the training may include determining the probability of a workload fingerprint for a given workload value, as noted at 1204. This training data represents the historical or baseline latency information used to support predicting future data storage network workload patterns and latencies. Further, this training data may be packaged and shipped with individual data storage network drives via implementation of the data into the management software of individual drives or in the management or controller software configured to control a plurality of network storage drives. Once the software containing the training model is packaged with the drive, the method continues to monitor data flow of I/Os and capture current sample metrics and data for analysis, as noted at 1205. At 1206 the method predicts the workload fingerprint corresponding to a current sample. The workload value corresponding to the workload fingerprint is calculated at 1207. At 1208 the method continues to forecast future latencies based on the workload value and time series data. The forecasting may use the ARIMA model, which is a statistical method for time series forecasting also known as Auto Regressive Integrated Moving Average. ARIMA is a class of model that captures a suite of different standard temporal structures in time series data.

Figure 13:
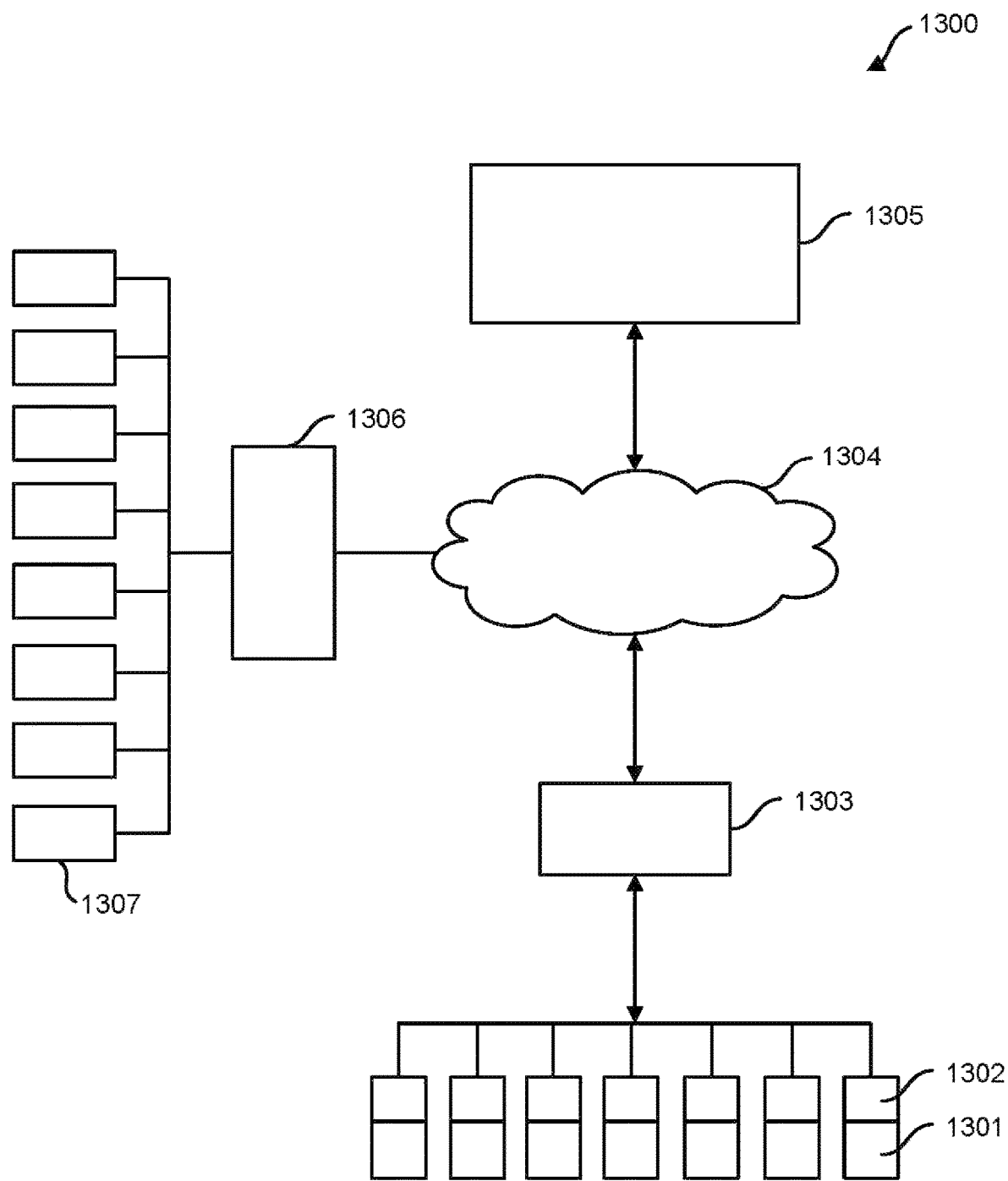
FIG. 13 illustrates an example hardware configuration for implementing example embodiments of the disclosure.

FIG. 13 illustrates an example hardware configuration 1300 for implementing example embodiments of the disclosure. The hardware configuration 1300 includes a plurality of data storage devices 1301, wherein each data storage device 1301 may include a management software 1302 incorporated therein. The management software may include a local processor configured to control the operation of the data storage device 1301 in accordance with a predetermined computer program running thereon. The computer program may be stored on a computer readable medium and contain instructions to be executed by the processor in the storage device 1301 to control the operation of the storage device 1301. The plurality of data storage devices 1301 may be connected together to form an array, storage system, or data storage network, which may be in communication with a data storage network computer or server controller 1303. The management software may be present at the drive, array, or data storage system level. The controller 1303 may be in communication with the cloud 1304, which may be in communication with the plurality of other devices, computers, servers, or other computer processing or data storage elements. One example device that may be in communication with the cloud 1304 may be a data center management computer or server 1305, which may be used by the manufacturer of the data storage elements 1301 to communicate with the data storage elements 1301 to obtain data or metrics from the storage device 1301 related to latency or other parameters or metrics of the storage device 1301. The cloud 1304 may also be in communication with other servers 1306 or data storage elements 1307, which may collectively define additional data storage networks.

The computer processor located in the data storage element 1301, the server controller 1303, or the management computer 1305 may be used to execute computer program instructions configured to analyze the performance of the data storage devices 1301, 1307. With regard to storage device 1301, the management software 1300 and to is typically associated with the manufacturer of the storage device 1301. As such, the management software 1302 may communicate with the management computer or server 1305 two share data or control information there between. The data storage elements 1307 are shown without management software included therein, which is to represent that the management software on those data storage devices 1307 are not communicating with the management computer or server 1305, as the data storage devices 1307 are likely from a different manufacturer than the owner or operator of the management computer or server 1305. As such, in example embodiments of the disclosure wherein the performance of a data storage network that is not associated with the performance evaluation software or method of the disclosure, then the method is software the disclosure must obtain the data latency metric information from a source other than the management software 1300 and to which is present in a storage device associated with the management computer server 1305. Therefore, the example methods and software the disclosure may utilize the cloud 1304, a data storage network controlling server 1006, or an application installed locally at a data storage network to monitor I/O requests in the data storage network and report latency metrics back to the software method of the disclosure for evaluation. Thus, examples of the disclosure allow for the method or software of the disclosure to evaluate latency performance of a data storage network containing foreign data storage elements or drives.

Example embodiments of the disclosure have application to various different types of data networks and configurations, such as a SAN, WAN, LAN, and other types of network configurations that involve a server or processing unit communicating with one or more data storage elements connected thereto. Example embodiments of the disclosure may also be applied to a host or an interconnected network of hosts.

Aspects presented in this disclosure may be embodied as a system, method, or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more non-transitory computer readable nnediunn(s) having computer readable program code embodied thereon. Any combination of one or more computer readable nnedium(s) may be utilized. The computer readable medium may be a computer readable signal medium or a computer readable storage medium. In the context of the disclosure, a computer readable storage medium may be any tangible non-transitory medium that can contain or store data or a program product for use by or in connection with an instruction execution system, apparatus, module, or device. Program code embodied on a non-transitory computer readable medium may be transmitted using any appropriate medium, including but not limited to wireless, wireline, optical fiber cable, RF, etc., or any suitable combination thereof.

Computer program code for carrying out operations for aspects disclosed herein may be written in any combination of one or more programming languages, including object-oriented programming languages such as Java, Smalltalk, C++ and the like or procedural programming languages, such as C+, C#, Objective C, Assembly, Ruby, Python, PHP, and SQL. The program code may be executed on any processor, whether local, remote, or in the cloud to control or analyze data in accordance with example embodiments of this disclosure.

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, implement the functions specified in the flowchart or block diagram.

Example embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In the preceding, reference is made to example embodiments of the disclosure, however, the scope of the disclosure is not limited to specific described embodiment(s). Rather, any combination of the above noted features, elements, or functionalities, whether related to different examples or not, is contemplated to implement and practice embodiments of the disclosure. Furthermore, although embodiments disclosed herein may achieve advantages over other possible solutions or over the prior art, whether or not a particular advantage is achieved by a given embodiment is not limiting of the scope of the disclosure. Thus, the preceding aspects, features, embodiments and advantages are merely illustrative and are not considered elements or limitations of the appended claims except where explicitly recited in a claim. Further, as used herein, the directional or orientation terms such as front, back, top, bottom, up, down, etc. are not meant to be limiting, but merely reflect the orientation of the respective embodiment as they appear in the Figures. It will be understood that the nomenclature used to designate each embodiment are interchangeable depending on the spatial orientation of the embodiment in use.

While the foregoing is directed to embodiments presented in this disclosure, other and further embodiments may be devised without departing from the basic scope of contemplated embodiments, and the scope thereof is determined by the claims that follow.

We claim:

1. A method performed by a system comprising a hardware processor, comprising:
creating a historical workload fingerprint model for a storage network from training data, comprising:
receiving the training data from the storage network, wherein the training data includes data latency metrics for the storage network;
creating a bin histogram representative of the training data;
creating a labelled point data structure using the bin histogram, the labelled point data structure comprising a plurality of points corresponding to different time intervals, and each respective point of the plurality of points represents a group of values representing corresponding numbers of input/output (I/O) operations of corresponding different sizes;
applying a clustering algorithm on the labelled point data structure to generate clusters representing respective workload types; and
classifying a current sample data from the storage network into a given cluster of the clusters generated by the clustering algorithm, wherein the given cluster represents a current workload type corresponding to the current sample data;
assigning a score to the current sample data based on the given cluster and the historical workload fingerprint model;
responsive to the score, correlating a measured latency value of the current sample data to historically measured values of a plurality of; and
identifying, based on the correlating, which of the plurality of factors is a cause of a latency corresponding to the current sample data in the storage network.

2. The method of claim 1, wherein the clustering algorithm comprises a k-means clustering algorithm.

3. The method of claim 1, wherein each respective point of the labelled point data structure further represents a first metric including a ratio of reads and writes, and a second metric including a cache hit ratio.

4. The method of claim 1, wherein the clustering algorithm comprises a Gaussian mixture model clustering algorithm.

5. The method of claim 1, further comprising:
identifying latency thresholds for respective workload types of the workload types, wherein the identifying of the latency thresholds produces a first latency threshold for a first workload type of the workload types, and produces a second latency threshold for a second workload type of the workload types; and
identifying the current sample data as representative of an outlier based on a latency threshold for the current workload type, the latency threshold for the current workload type being one of the latency thresholds.

6. The method of claim 5, wherein the identifying of the latency thresholds comprises identifying a data point or location for a workload type where a latency percentile slope plot changes from a first slope to a second slope at an elbow.

7. The method of claim 1, further comprising applying the clustering algorithm to the current sample data to classify the current sample data.

8. The method of claim 1, wherein the plurality of factors comprise a factor relating to an operation of a processor, and a factor relating to an operation of a cache.

9. The method of claim 1, wherein the correlating responsive to the score comprises performing the correlating responsive to the score being greater than zero.

10. A non-transitory computer readable medium comprising computer executable instructions stored thereon, that when executed by a processor, cause the processor to perform a method for identifying latency contributors in a data storage network, comprising:
creating a historical workload fingerprint model for a data storage network from training data, the workload fingerprint model comprises a multi-dimension vector representative of at least I/O counts in the training data, a read/write ratio of the training data, and a cache hit percentage in the training data;
monitoring and classifying a current sample data from the data storage network into a cluster, current workload fingerprint, and current workload type;
assigning a score to the current sample data based on the historical workload fingerprint model; and
correlating measured latency values from the current sample data to historically measured latency related factors to create a latency score chart that identifies factors causing latency in the data storage network for the current sample data.

11. The non-transitory computer readable medium of claim 10, wherein the read/write ratio represents a ratio of a number of reads and a number of writes, and wherein the cache hit percentage represents a percentage of hits of a cache in response to reads and writes.

12. The non-transitory computer readable medium of claim 10, wherein the creating of the historical workload fingerprint model comprises:
receiving the training data from the data storage network, the training data comprising latency metrics for the data storage network;
creating a bin histogram representative of the training data;
creating a labelled point data structure using the bin histogram, the labelled point data structure comprising a plurality of points corresponding to different time intervals, and each respective point of the plurality of points represents a group of values representing corresponding numbers of input/output (I/O) operations of corresponding different sizes;
applying a clustering algorithm on the labelled point data structure to generate clusters representing respective workload types; and
identifying latency thresholds for each workload type of the workload types.

13. The non-transitory computer readable medium of claim 12, wherein the clustering algorithm comprises a k-means clustering algorithm.

14. The non-transitory computer readable medium of claim 12, wherein each respective point of the labelled point data structure further represents a first metric including a ratio of reads and writes, and a second metric including a cache hit ratio.

15. The non-transitory computer readable medium of claim 12, wherein the clustering algorithm comprises a Gaussian mixture model clustering algorithm.

16. The non-transitory computer readable medium of claim 12, wherein the computer executable instructions when executed cause the processor to further:
identify latency thresholds for respective workload types of the workload types, wherein the identifying of the latency thresholds produces a first latency threshold for a first workload type of the workload types, and produces a second latency threshold for a second workload type of the workload types.

17. The non-transitory computer readable medium of claim 16, wherein the identifying of the latency thresholds comprises identifying a data point or location for a workload type where a latency percentile slope plot changes from a first slope to a second slope at an elbow.

18. A system comprising:
a processor; and
a non-transitory storage medium storing instructions executable on the processor to:
generate a historical workload fingerprint model by:
receiving training data comprising latency metrics for a storage network;
creating a labelled point data structure comprising a plurality of points corresponding to different time intervals, wherein each respective point of the plurality of points represents a group of values representing corresponding numbers of input/output (I/O) operations of corresponding different sizes;
applying a clustering algorithm on the labelled point data structure to generate clusters representing respective workload types; and
classify a current sample data from the storage network into a given cluster of the clusters generated by the clustering algorithm, wherein the given cluster represents a current workload type corresponding to the current sample data;
assign a score to the current sample data based on the given cluster and the historical workload fingerprint model;
responsive to the score, correlate measured latency values of the current sample data to historically measured factors, the historically measured factors being different from latency;

identify, based on the correlating, which of the historically measured factors is a cause of latency corresponding to the current sample data in the storage network.

19. The system of claim 18, wherein each respective point of the labelled point data structure further comprises a first metric including a ratio of reads and writes, and a second metric including a cache hit ratio.

20. The system of claim 18, wherein the historically measured factors comprise a factor relating to an operation of a processor, and a factor relating to an operation of a cache.

\* \* \* \* \*